Dec. 26, 1922.

C. L. POST.
ENVELOPE HANDLING DEVICE.
FILED DEC. 6, 1920.

Witnesses:
C. F. Kilroy
Harry R. L. White

Inventor:
Claude L. Post
By Hill & Hill
Attys

Dec. 26, 1922.

C. L. POST.
ENVELOPE HANDLING DEVICE.
FILED DEC. 6, 1920.

C. L. POST.
ENVELOPE HANDLING DEVICE.
FILED DEC. 6, 1920.

1,439,755

Dec. 26, 1922.
1,439,755

C. L. POST.
ENVELOPE HANDLING DEVICE.
FILED DEC. 6, 1920.

C. L. POST.
ENVELOPE HANDLING DEVICE.
FILED DEC. 6, 1920.

Witnesses:
W. F. Kilroy
Harry R. L. White

Inventor.
Claude L. Post
By Hill & Hill Attys.

Patented Dec. 26, 1922.

1,439,755

UNITED STATES PATENT OFFICE.

CLAUDE L. POST, OF CHICAGO, ILLINOIS.

ENVELOPE-HANDLING DEVICE.

Application filed December 6, 1920. Serial No. 428,691.

*To all whom it may concern:*

Be it known that I, CLAUDE L. POST, a citizen of the United States, residing at Chicago, in the county of Cook and State of Illinois, have invented certain new and useful Improvements in an Envelope-Handling Device, of which the following is a description.

My invention relates to improvements in an envelope feeding and handling device designed for the printing of return addresses or other matter on envelopes.

An object of my invention is to provide a press with means for feeding envelopes from a magazine to printing rollers or the like by turning the envelope flaps in such a manner as to be successively engaged by such rollers.

A further object of my invention is to provide a cam-controlled finger for successively engaging the flaps of envelopes stored in a magazine, and turning such flaps so that they are in engaging position with the feeding means, whereby the envelopes are successively withdrawn from the magazine for any purpose desired.

Another object of my invention is to provide means for automatically closing the flaps of successive envelopes after said envelopes have been printed, and to convey the envelopes away from the discharging side of the printing rollers.

Another object of my invention is to provide automatic means to prevent contact between the platen and the type whenever there is no envelope passing through the rolls.

Another object of my invention is to provide inking rollers which will distribute the ink evenly over their surfaces, the ink-receiving rollers being given a reciprocatory as well as a rotary movement.

Another object of my invention is to provide a type-holding roll wherein the type may be adjustably clamped in place and readily removable from the roll.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts.

The preferred form of construction as shown in the drawings, comprises a frame having side members 1 and 2, connected together by spaced tie rods 3 and 4. The side frames are rearwardly extended to form arms 5 and 6 having offset ends turned upwardly thereof, and adapted to receive bodily movable journal boxes 7 therein. The forward portions of said side frames are adapted to support the envelope magazine M, said magazine being removably held in position thereon by screws 8 or the like.

The magazine M comprises a bottom 9 for supporting the body or pile of envelopes, there being an opening 10 in said bottom for permitting the envelope flaps F to drop slightly relative to the body of the envelopes. The shape of the opening corresponds more or less to the shape of an envelope flap, with the exception of a recess 11, which is provided to allow clearance for a movable finger 12, the function of which will be hereinafter described.

The rear wall 13 of the magazine projects downwardly a sufficient distance to retain the envelopes in said magazine when an envelope is being acted upon by the finger 12. The magazine further comprises walls 14 and 15 for positioning the front corners of the envelopes contained in the magazine, the opening in the magazine walls being of use in enabling one to determine how many envelopes are stored in the magazine.

A stub shaft 16 is journaled in frame 2, and is provided with a driving pulley 17 and a driving gear 18 thereon. A driven shaft 19 is also journaled in the frame parallel to the stub shaft 16, said shaft 19 carrying a type roll 21 and a driven gear 20, which meshes with the gear 18. A shaft 22, carrying a platen roll 23, is journaled in the frame parallel to the shaft 19, the shaft 22 carrying a gear 24, which meshes with the gear 20.

Figure 6:
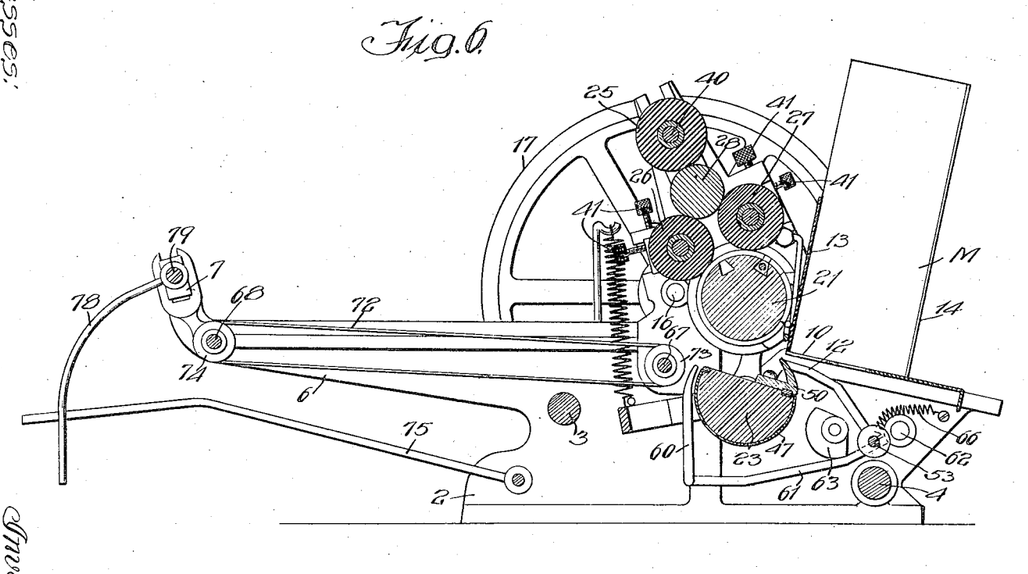
Fig. 6 is a vertical section taken on line 6—6 of Fig. 3.

Inking rolls 25, 26 and 27 and an ink-distributing roll 28 are journaled in the frame, as shown most clearly in Fig. 6, the roller 25 receiving the ink thereon and contacting with the distributer 28, the distributer in turn contacting with both the spaced rolls 26 and 27. The distributer roll is mounted on a shaft 29, said shaft carrying a gear 30, which is driven by gear 20 through an idler gear 31, said gear 31 being mounted on stub shaft 32 on the frame.

On the opposite end of shaft 19 to that carrying gear 20 is mounted a beveled pinion 33 meshing with a beveled gear 34, said gear 34 being secured to a shaft 35 journaled to the outer side of the frame so that its axis is perpendicular to the axis of shaft 19. A disk 36 is positioned on the end of shaft 35, and has a pin 37 projecting therefrom at one side of the rotational axis of the shaft. The pin 37 is adapted to engage within an elongated slot 38 provided in a block 39 secured to the end of the shaft 40, said shaft 40 carrying the ink-receiving roller 25. When the beveled gears are driven through the main drive gear 18, the pin and slot connection will reciprocate the main ink-receiving roller 25 during the rotation of said roller. This action spreads the ink evenly over the surface of the roll, and greatly aids its ink distributing efficacy.

Figure 1:
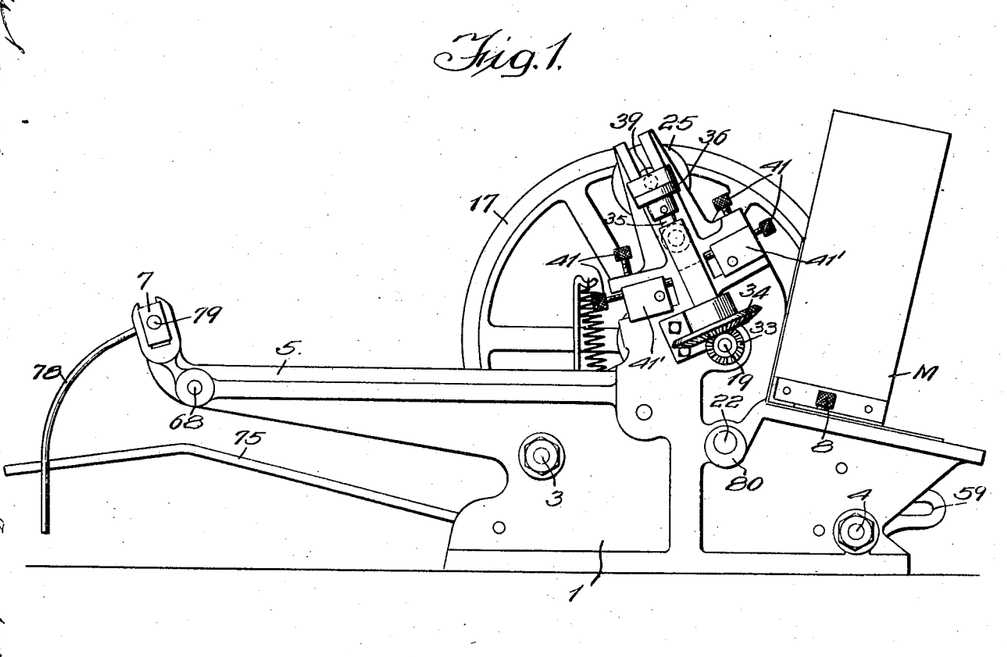
Figure 1 is a side elevation of my improved device.
Figure 2:
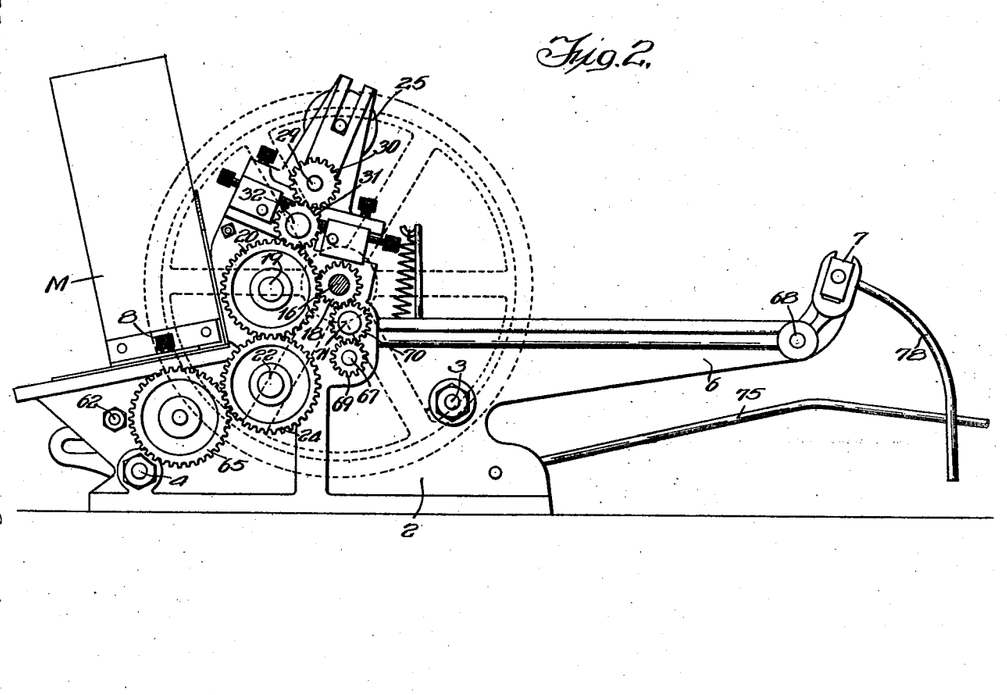
Fig. 2 is a side elevation taken on the opposite side from that shown in Fig. 1.
Figure 3:
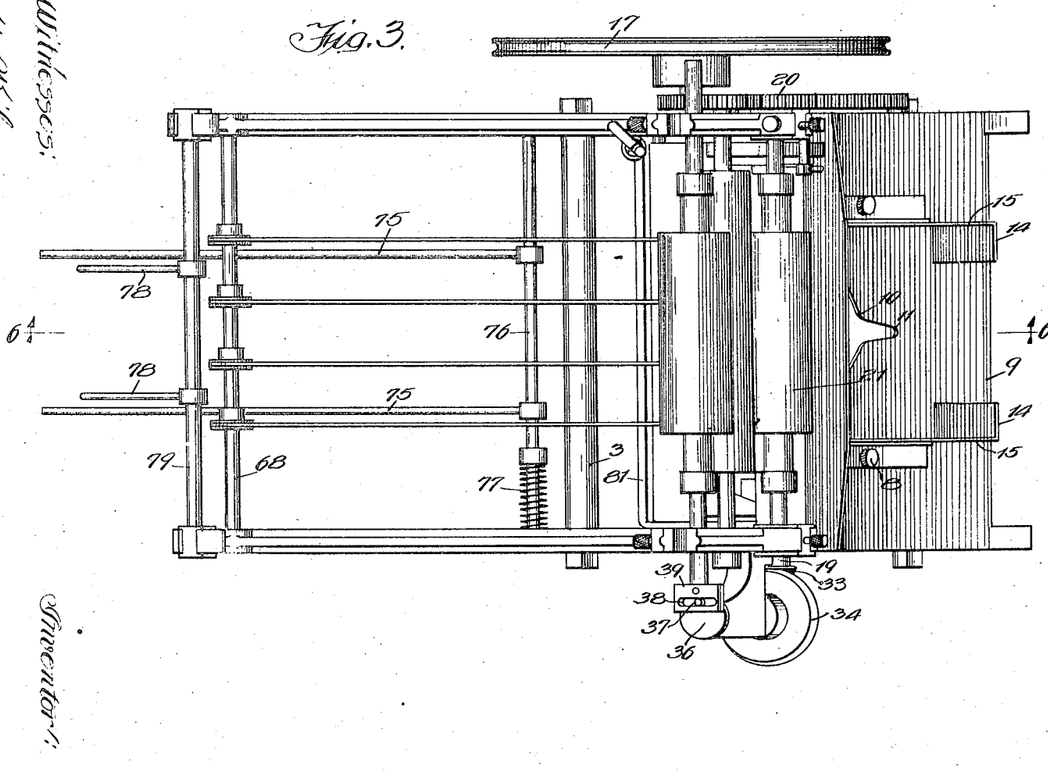
Fig. 3 is a plan view of the device as seen from above.
Figure 4:
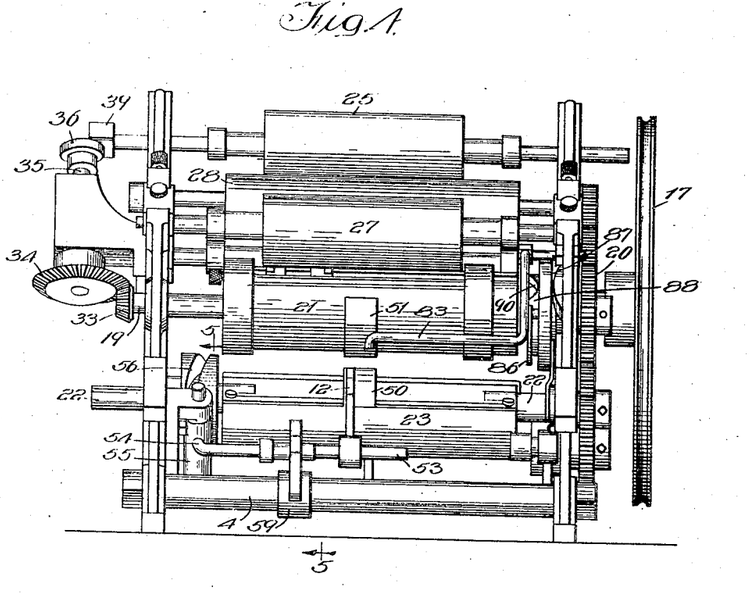
Fig. 4 is a front elevation of the same.

The inking rolls 26 and 27 are so journaled that they can be independently adjusted laterally of the distributing roll 28, and thus maintain the proper contact therewith and with the type on the type roll with which they cooperate, as shown in Fig. 6, said adjustment being effected by adjusting screws 41 operable to move journal boxes 41' positioned in the frame, as shown in Fig. 1.

Figure 12:
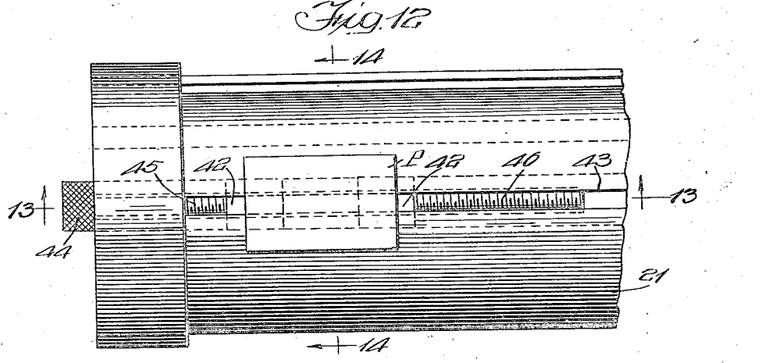
Fig. 12 is a plan view of the rolls shown in Fig. 10, as seen from above, showing a type plate in place.
Figure 13:
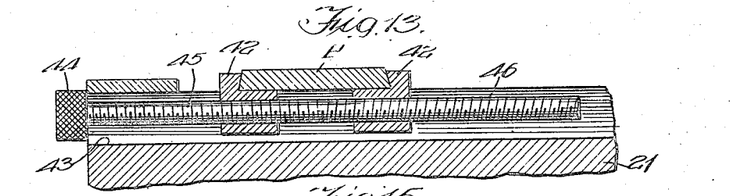
Fig. 13 is a section taken on line 13—13 of Fig. 12.
Figure 14:
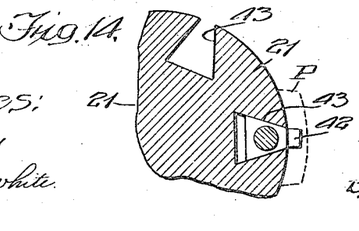
Fig. 14 is a section taken on line 14—14 of Fig. 5, with a portion of the type-holding rolls broken away.
Figure 15:
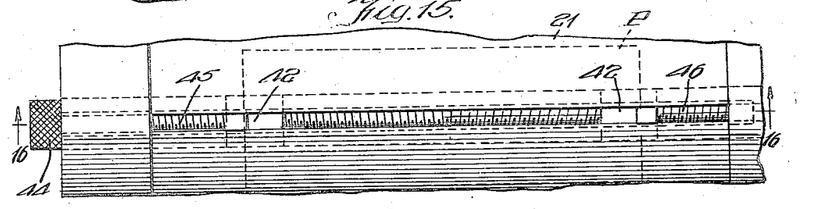
Fig. 15 is a view similar to Fig. 12, showing a different size printing plate in position.
Figure 16:
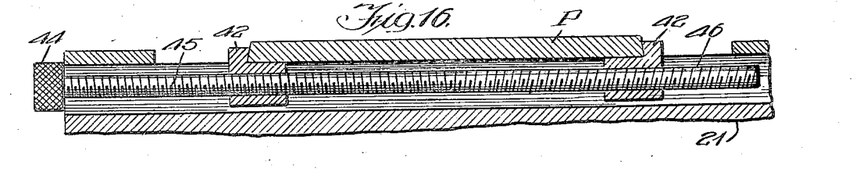
Fig. 16 is a section on the line 16—16 of Fig. 15.

The type roll 21 has suitable grooves or slots 43 therein and extending longitudinally thereof, said grooves being preferably dovetailed in cross section to receive the type-holding clamping members. The type or printing plates P shown in Figs. 12–14 inclusive, are clamped between pairs of adjustable clamping members 42, each of said members 42 being of dovetailed cross section, and having a threaded aperture therethrough. Extending longitudinally of each slot is a threaded bar having a knurled thumb knob 44 at its outer end, the body of the bar being divided into two oppositely threaded portions 45 and 46, one of said portions having right-handed threads thereon, and the other of said portions having left-handed threads thereon, so as to receive a clamping element 42 on each of said oppositely threaded portions. Thus, a rotation of the threaded bar will move the clamping elements in unison so as to clamp or release the type or printing plate therebetween. Inasmuch as both the clamps and the printing plate have cooperating beveled edges, the clamping movement will force the plate downwardly on the type roll, and will force the clamps upwardly in the dovetailed slots, thereby firmly fixing their position longitudinally of the type roll. The centering of the printing plate may be adjustably varied by the rotation of the clamping elements individually on the bar after the bar and clamps are removed, so as to be free of the slots.

The platen or tympan roll is cut away on a chord thereof, as shown in Fig. 6, there being a tympan sheet 47 detachably secured to the tympan by rods 48 and 49.

Projecting circumferentially of the platen roll and preferably being detachably secured thereto at a point approximately at its center, is a segmental feeding arc 50, adapted to cooperate with a segmental feeding arc 51 secured circumferentially of the type roll 21, to grip the extending open flaps of the successive envelopes, and to feed them between the type and platen rolls.

Secured to the type roll 21 are circular feeding arcs 52, preferably adjustable longitudinally of the roll, and held in adjusted position by screws or the like, said feeding arcs 52 being adapted to contact with the bodies of the envelopes passing between the rolls, and feeding them through the rolls. It will be noted that the rings 52 project radially beyond the arc 51, so that there is no possibility of accidentally inking said feeding arc 51.

Figures 9, 10:
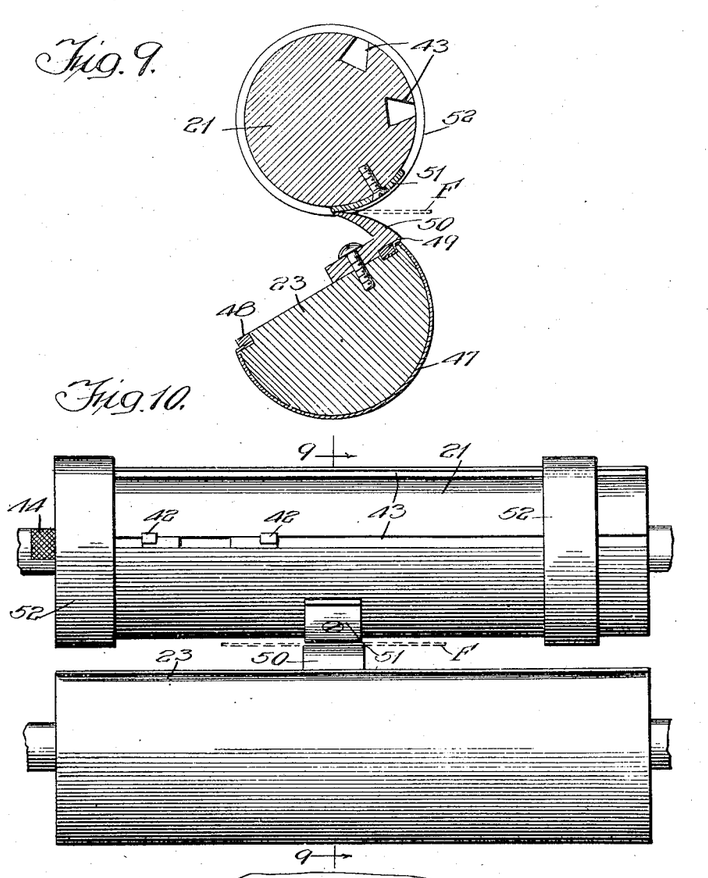
Fig. 9 is a section on line 9—9 of Fig. 10.
Fig. 10 is a detail of the platen and type-holding rolls.
Figure 11:
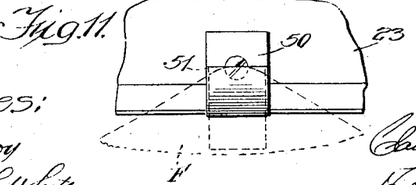
Fig. 11 is a plan view showing the extended envelope flap between the segmental feeding arcs.

Inasmuch as the envelope flaps taper, it will be seen that they will first be gripped by the feeding arcs 50 and 51, and then subsequently by the arcs 52, as the circular portion of the platen begins its registry with said arcs 52 (see Fig. 9). The flap-engaging finger 12 is mounted on a rod 53, one end of said rod being bent as at 54, said bent end being pivotally mounted in a block 55, said block 55 being also pivotally mounted so that its plane of pivotal movement is perpendicular to the plane of the pivotal movement of said journaled rod end 54. Thus, the finger 12 is free to pivot in two planes, one at right angles to the other.

The finger 12 is actuated by a double-contact cam 56, said cam being secured to and driven by the shaft 22, and contacting with a roller 57 secured to an arm 58, said arm 58 being rigidly attached to the journaled block 55.

Figure 5:
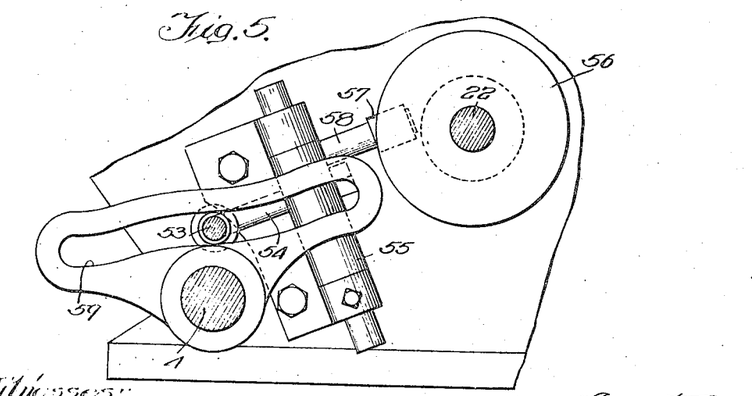
Fig. 5 is a vertical section taken on the line 5—5 of Fig. 4.

A guide 59 is positioned on the tie bar 4 so as to guide the vertical movement of the feeding finger 12 as it moves laterally of the feeding rolls. A sleeve or roller is mounted between the rod 53 and guide 59 so as to minimize the friction therebetween, said sleeve being renewable when worn. It will be noted from Fig. 5 that, as the finger 12 moves toward the feeding rolls, it is given an upward and then a downward movement for a purpose to be hereinafter described.

Assuming that the ink has been supplied to the rolls 26 and 27, and that the finger 12 is in its lowermost position, then upon starting the machine, the point of said finger will move inwardly of said feeding rolls over the flap of the bottom envelope in the magazine. Further inward movement of the finger will effect a swinging of the flap F on the axis of the fold thereof, so that by the time the finger 12 reaches the position shown in Fig. 6, said flap will assume substantially a vertical position relative to the body of the envelope. At this point, the finger will have dropped somewhat in order to maintain contact with the flap F, and to prevent its punching the flap at its juncture with the body of the envelope. Said dropping of the finger 12 is effected by the curvature of the guideway 59, as shown particularly in Fig. 5.

The finger 12 is then moved outwardly away from the rolls, and as it does so, the segmental feeding arcs 50 and 51 grip the open flap and feed it through the printing mechanism, and when the body of the envelope is reached, the type block P will register with the platen to accomplish the printing operation.

It will be noted that the arc of movement of the upper edge of the flap projects into the arc of movement of the feeding arc 50, but that interference with the latter is prevented by the cutaway portion beyond the chord, which forms a proper clearance for the flap movement.

The feeding arcs 52 cooperate with the arcs 50 and 51 and engage the body of envelopes to feed it through the rolls, said feeding arcs 52 being adjustable longitudinally of the type roll so that they may be positioned to engage one or both ends of the envelope body. The envelope flaps are closed to their original position on their line of fold, and conveyed to any desired point, where they are automatically stacked.

A finger 60, having a slightly curved end and extending upwardly at the discharge side of said feeding arcs, has a portion 61 extending forwardly of the frame and pivoted to the frame at 62. A cam 63 is journaled on a shaft 64 in the frame, said shaft having a gear 65 in mesh with the gear 24, secured to the platen shaft. The cam and finger portion 61 are maintained in contact by a spring 66 attached to the finger portion 61 and having its other end attached to the frame.

A pair of shafts 67 and 68 are arranged on said frame, one near the discharge side of the feed rolls, and the other at the outer end of the frame extension 6, said shaft 67 having a gear 69 at one end, in mesh with an idler gear 70 mounted on a stub shaft on said frame. Gear 70 in turn is in mesh with and driven by the drive gear 18. One or more conveyor belts 72 pass over pulleys 73 and 74 on said shafts 67 and 68 respectively.

As the envelopes are discharged through the feed rolls with their flaps open and extended, the end of the finger 60 which is then near its upward limit of travel engages the outer surface of the flap and directs it downwardly in proximity to the tympan roll, the flap closing completely as the envelope moves past the end of the finger 60. The finger 60 is governed by the cam 63 so that, as the envelope is being fed by the arcs 52, (the grip of said flaps being released at the end of the feeding arcs 50 and 51,) the finger 60 is caused to move substantially vertically upwards to a position in readiness for a like folding action on the next succeeding envelope.

Rearwardly extending stacking bars 75 are connected to a shaft 76, said shaft 76 being pivotally connected to the frame, and there being a spring 77 surrounding said shaft and so arranged as to press said bars 75 upwardly.

Cooperating with the bars 75 are bars 78, said bars extending laterally between said bars 75 and being fixed to a shaft 79, pivoted to the movable journal boxes 7.

Then, as the envelopes are folded and ejected, they are carried along the conveyor belt and drop onto the outer ends of bars 75, being guided by bars 78. As the stack increases, the bars 75 lower, so that the distance between the conveyor and the top of the stack is maintained substantially constant.

In order that the type shall not make an impression on the tympan sheet when there is no envelope passing between the rolls, I have provided an automatically acting safety device for separating the type and platen rolls at their period of registry, if there is no envelope feeding through the rolls.

Figure 7:
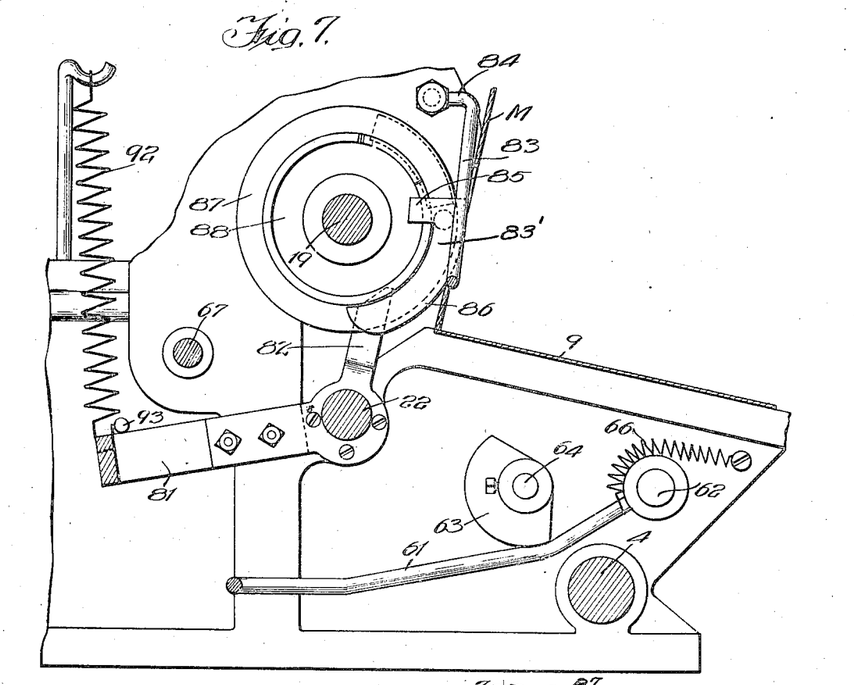
Fig. 7 is a section taken on the line 7—7 of Fig. 8.

The shaft 22 is eccentrically journaled in bearing sleeves 80, one in each side frame member, a bail 81 being secured to said sleeves in any suitable manner, said bail being adapted to be actuated by a bell crank having one arm 82 offset laterally of the bail, as shown in Fig. 7. Whenever the arm 82 is actuated to the left, as shown in Fig. 7, it will oscillate the sleeves 80 through a quarter turn so that the distance between the centers of the rolls 21 and 23 is increased, and thus the type will not contact with the platen to make an impression as it registers therewith.

The means for automatically operating the arm 82 comprises a gravity actuated member 83 extending into the path of the envelopes as they pass from the magazine to the rolls, and having one end bent laterally and pivotally mounted to the frame as at 84, so that said member is permitted to drop whenever there is no envelope passing to the rolls.

Secured to the member 83 near its pivotal end, in any suitable manner, as by brazing, riveting or the like, is an arcuate member 83′ having an inwardly extending leg 85 and a circumferentially extending leg 86. Fixed to the shaft 19 is a flanged collar having an annular flange 87 and an annular body portion 88 of lesser diameter than said flange. A pin 89 is mounted on said flange so as to be slidable longitudinally therein. The annular body portion 88 has a radial groove 90 therein, cut in its plane face and adapted to receive the leg 85 of the arcuate member 83′.

Secured to the frame in any suitable manner, as by casting, riveting, screwing or the like, is a cam 91, said cam extending inwardly into the path of the slot of pin 89.

Figure 8:
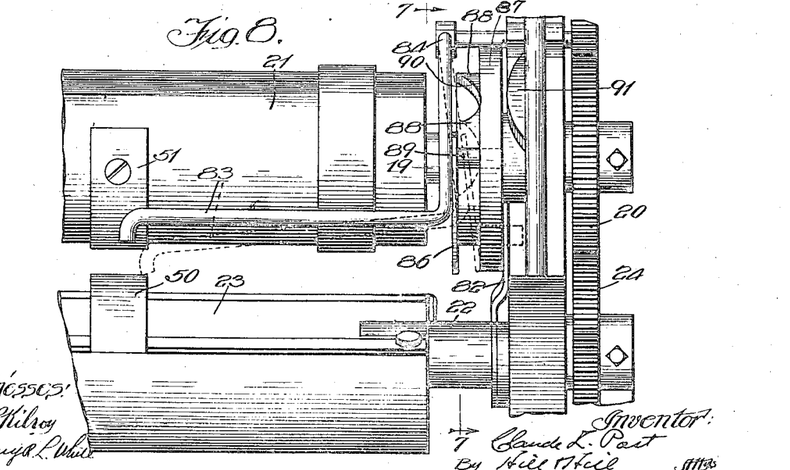
Fig. 8 is an elevation, with parts broken away to show the details of the platen and type roll separating mechanism.

The operation of the bail 81 is as follows: When envelopes pass between the magazine and the feeding arcs 50 and 51, they support the arm 83 so that the member 83′ bears against the annular disk 88, but as soon as there is no envelope between the magazine and the feeding arcs, the arm 83 pivotally drops, allowing the leg 85 to enter the groove 90. The collar being fixed to the shaft 19 continues in its rotation and brings the end of the slidable pin 89 into contact with the circumferentially extending leg 86, pushing the pin outwardly in the flange 87. The pin is now in the path of the arm 82, and continuing in its rotation will actuate the arm to the left (see Figs. 7 and 8), so that the bail 81 and its arcuate sleeve 80 will oscillate through a quarter turn to separate the rolls 21 and 23.

As soon as the pin 89 has passed the arm 82, the bail is retracted to its initial position by a spring 92, secured in any suitable manner to the bail and frame. A stop 93 projects into the path of the bail to limit its upward movement.

The pin 89 continues in its rotation until it contacts with the surface of the cam 91, whereby it is pushed inwardly to its initial position.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a sheet handling device of the kind described, the combination with a pair of feeding rolls having segmental cooperating feeding arcs thereon, a circumferential band on one of said rolls axially of said segmental arcs, and adapted to contact with the sheets passing between said rolls to continue their feeding movement beyond the feeding action of said segmental arcs, of a magazine adapted to have a plurality of sheets therein, and having a discharge opening adjacent said rolls, and means for successively engaging sheets positioned in said opening and positioning them so that they may be initially engaged by said segmental arcs prior to their engagement by said circumferential band.

2. In a device of the kind described, the combination with a pair of feeding rolls adapted to feed sheets through said rolls, having segmental cooperating feeding arcs thereon, a circumferential band on one of said rolls spaced axially of said segmental arcs, adjustable longitudinally thereof and adapted to contact with the sheets positioned between said rolls to continue their movement beyond the feeding action of said segmental arcs, of a magazine adapted to contain a plurality of sheets therein, and having a discharge opening adjacent said rolls, and means for successively engaging the sheets positioned in said opening and positioning them into engagement with said arcs.

3. In a sheet handling device, the combination with a pair of feeding rolls having segmental cooperating feeding arcs thereon, a circumferential band on one of said rolls spaced axially of said segmental arcs, and adapted to contact with the sheets passing between said rolls to continue their feeding movement beyond the feeding action of said segmental arcs, said circumferential band projecting radially beyond the feeding arc on said rolls, of a magazine adapted to contain sheets therein, and having a discharge opening adjacent said rolls, and means for successively engaging said sheets positioned in said opening, and positioning them into engagement with said arcs.

4. In an envelope handling device, the combination with a type roll and a platen roll having segmental cooperating feeding arcs thereon, a circumferential band on said type roll, spaced axially of said segmental arcs and adapted to contact with the envelope passing between said rolls to continue their feeding movement beyond the feeding action of said segmental arcs, of a magazine having envelopes therein, and having a discharge opening adjacent said rolls, and means for successively engaging envelope flaps positioned in said openings and turning said envelopes on the fold thereof into engagement with said arcs.

5. In an envelope handling device, the combination with a type roll and a platen roll having segmental cooperating feeding arcs thereon, a circumferential band on said type roll, spaced axially of said segmental arcs, adjustable longitudinally thereof and adapted to contact with the envelope passing between said rolls to continue their movement beyond the feeding action of said segmental arcs, of a magazine having envelopes therein, and having a discharge opening adjacent said rolls, and means for successively engaging envelope flaps positioned in said openings and turning said envelopes upon the fold thereof into engagement with said arcs.

6. In an envelope handling device, the combination with a type roll and a platen roll having segmental cooperating feeding arcs thereon, a circumferential band on said type roll, spaced axially of said segmental arcs and adapted to contact with the envelopes passing between said rolls to continue their feeding movement beyond the feeding action of said segmental arcs, said circumferential band projecting radially beyond the feeding arc on the type roll so as to prevent inking of said feeding arc, of a magazine having envelopes therein, and having a discharge opening adjacent said rolls, and means for successively engaging envelope flaps positioned in said openings and turning said envelopes on the fold thereof into engagement with said arcs.

7. An envelope handling device comprising a type roll and a platen roll geared together, cooperating feeding arcs arranged on said rolls to feed envelopes therebetween, an envelope magazine having a discharge opening therein, and means for successively engaging envelope flaps projecting through said opening and turning said flaps into engagement with said feeding arcs, said means comprising a cam-controlled finger pivotally mounted so as to be movable in two planes mutually perpendicular to one another.

8. An envelope handling device comprising a type roll and a platen roll geared together, cooperating feeding arcs arranged on said rolls to feed envelopes therebetween, an envelope magazine having a discharge opening therein, and means for successively engaging envelope flaps projecting through said opening and turning said flaps into engagement with said feeding arcs, said means comprising a cam, actuating means for said cam, a pivotally journaled arm controlled by said cam, a finger pivotally mounted on said arm so as to pivot perpendicularly to the journal axis of said arm and a guide cooperating with the fold end of said finger to guide its vertical movement.

9. An envelope handling device comprising a pair of cooperating printing rolls, a plurality of pairs of feeding arcs on said rolls arranged for intermittent registration, an envelope magazine having a discharge opening adjacent said rolls, means for successively engaging envelope flaps positioned in said opening and turning said flaps on the fold thereof so that the extended flaps may be initially engaged by one of said pair of arcs in advance of their engagement by the other pair of arcs, and means at the discharge side of said rolls for successively engaging said flaps to close them on the fold thereof.

10. An envelope handling device comprising a pair of cooperating printing rolls, feeding arcs on said rolls arranged for intermittent registration, an envelope magazine having a discharge opening adjacent said rolls, means for successively engaging envelope flaps positioned in said opening and turning said flaps on the fold thereof into engagement with said arcs, and a finger at the discharge side of said rolls for successively engaging said flaps to close them on the fold thereof, said finger being intermittently operable so as to engage said flaps and direct their closure.

11. An envelope handling device comprising a pair of cooperating printing rolls, feeding arcs on said rolls arranged for intermittent registration, an envelope magazine having a discharge opening adjacent said rolls, means for successively engaging envelope flaps positioned in said opening and turning said flaps on the fold thereof into engagement with said arcs, and a finger movable substantially vertically of said envelopes at the discharge side of said rolls for successively engaging said flap to close them on the fold thereof.

12. An envelope handling device comprising a pair of cooperating printing rolls, feeding arcs on said rolls arranged for intermittent registration, an envelope magazine having a discharge opening adjacent said rolls, means for successively engaging envelope flaps positioned in said opening and turning said flaps on the fold thereof into engagement with said arcs, an intermittently operable slightly curved finger movable upwardly and downwardly of said envelope at the discharge side of said rolls for successively engaging said flaps to close them on the fold thereof, and a cam for operating said finger at the termination of registration of said feeding arcs.

13. An envelope handling device comprising a pair of cooperating printing rolls, central feeding arcs and side feeding arcs on said rolls arranged for intermittent registration, an envelope magazine adjacent said rolls, means for successively engaging envelope flaps positioned in said opening and turning said flaps on the fold thereof so as to extend them, whereby they may be initially engaged by said central arcs and engaged by the side arcs substantially at the end of the feeding of said central arcs, means for closing said flaps after printing, and means for conveying said envelopes away from said rolls.

14. An envelope printing device comprising a pair of cooperating printing rolls, a plurality of pairs of feeding arcs on said rolls arranged for intermittent registration, an envelope magazine having a discharge opening adjacent said rolls, means for successively engaging envelope flaps positioned in said opening and turning said flaps on the fold thereof so as to extend them, whereby they may be initially engaged by one of said pairs of arcs and engaged by the other arcs substantially at the end of the feeding of said initially engaging arcs, a conveyor at the discharge side of said rolls, and means for closing said flaps and guiding the envelopes so that they are carried onto said conveyor.

15. An envelope printing device comprising a pair of cooperating printing rolls, a plurality of pairs of feeding arcs arranged for intermittent registration, an envelope magazine having a discharge opening adjacent said rolls, means for successively engaging envelope flaps positioned in said opening and turning said flaps on the fold thereof, so as to extend them, whereby they may be initially engaged by one of said pairs of arcs and engaged by the other arcs substantially at the end of the feeding of said initially engaging arcs, a conveyor at the discharge side of said rolls, and a finger engageable with the outer side of said flaps and cooperable with said conveyor to close said flaps and to guide the envelopes onto said conveyor.

16. An envelope printing device comprising a pair of cooperating printing rolls, a plurality of pairs of feeding arcs on said rolls arranged for intermittent registration, an envelope magazine having a discharge opening adjacent said rolls, means for successively engaging envelope flaps positioned in said opening and turning said flaps on the fold thereof, so as to extend them, whereby they may be initially engaged by one of said pairs of arcs and engaged by the other arcs substantially at the end of the feeding of said initially engaging arcs, a belt conveyor at the discharge side of said rolls, and means for guiding the open flaps of successive envelopes to effect a closing movement about their line of fold so that they ride onto said belts and are conveyed thereby.

17. An envelope printing device comprising a pair of cooperating printing rolls, feeding arcs on said rolls arranged for intermittent registration, an envelope magazine having a discharge opening adjacent said rolls, means for successively engaging envelope flaps positioned in said opening and turning said flaps on the fold thereof into engagement with said arcs, a belt conveyor at the discharge side of said rolls, and a finger movable transversely of said envelopes and operable at the end of the intermittent registration of said rolls to engage the open flaps of successive envelopes to effect their closure.

18. In a device of the kind described, a pair of printing rolls in geared relation and adapted to have sheets fed therethrough, and means for separating said rolls when there are no sheets passing therethrough, said means comprising a pivoted arm adapted to bear on said sheets, a cam on one of the rolls and engageable with said arm to permit it to be moved in a vertical plane, a slidable pin on said cam and adapted to be actuated by said arm as it drops when there are no sheets passing between the rolls, and means engageable by said pin to move one of said rolls away from the other.

19. In a device of the kind described, a pair of printing rolls in geared relation, and adapted to have sheets fed therethrough, and means for separating said rolls when there are no sheets passing therethrough, said means comprising a cam carried by one of said rolls, and having a pin slidable therethrough, an arm engageable with said cam and adapted to bear on the sheets passing through said rolls, said arm being movable to actuate said pin, a bell crank lever carried by the other of said rolls, said pin being normally out of the path of said bell crank lever and engageable therewith to separate said rolls after it is actuated by said arm, and cam means for returning said pin to its normal position after each separation of the rolls.

20. In a machine of the kind described, a pair of parallel arranged printing rolls in geared relation, one of said rolls being eccentrically journaled so that the distance between the rolls may be varied, means for feeding sheets successively between said rolls, and means for oscillating the eccentric journals to increase the space between said rolls when there are no sheets passing therebetween, said means comprising an arm pivotally mounted so as to be movable in a vertical plane and adapted to bear on said sheets, a cam carried by the fixedly journaled roll and engageable with said pivotal arm to permit it to drop by gravity when there is no sheet passing between said rolls, a pin slidably carried by said cam, said pin being adapted to be actuated by the falling arm, a bell crank lever carried by said eccentric journals and adapted to be actuated by said pin to oscillate said eccentric journals, means for returning said lever to its normal position after the separation of said rolls, and stationary cam means adapted to engage said pin after each actuation of said bell crank to return said pin to its normal inoperative position.

In testimony whereof, I have hereunto signed my name in the presence of two subscribing witnesses.

CLAUDE L. POST.

Witnesses:
  John W. Hill,
  Bertha Hartmann.